US012604218B2

(12) United States Patent　　(10) Patent No.:　US 12,604,218 B2
Schuh et al.　　(45) Date of Patent:　Apr. 14, 2026

(54) PERFORMANCE DEGRADATION HANDLING BETWEEN RADIO ACCESS NETWORK NODES

(71) Applicant: Telefonaktiebolaget LM Ericsson (publ), Stockholm (SE)

(72) Inventors: Ralf Schuh, Lund (SE); Torbjörn Elfström, Fjärås (SE); Johan Thorebäck, Sundbyberg (SE); Christian Bergljung, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 790 days.

(21) Appl. No.: 17/760,260

(22) PCT Filed: Feb. 6, 2020

(86) PCT No.: PCT/EP2020/052931
§ 371 (c)(1),
(2) Date: Aug. 5, 2022

(87) PCT Pub. No.: WO2021/155926
PCT Pub. Date: Aug. 12, 2021

(65) Prior Publication Data
US 2023/0051120 A1　　Feb. 16, 2023

(51) Int. Cl.
　*H04W 24/08*　　(2009.01)
　*H04B 7/06*　　(2006.01)
　*H04W 56/00*　　(2009.01)
(52) U.S. Cl.
　CPC .......... *H04W 24/08* (2013.01); *H04B 7/0617* (2013.01); *H04W 56/002* (2013.01)
(58) Field of Classification Search
　None
　See application file for complete search history.

(56) References Cited

U.S. PATENT DOCUMENTS 9,699,719 B2 * 7/2017 Ni ......................... H04W 48/18
2008/0311944 A1 12/2008 Hansen et al.
(Continued)

FOREIGN PATENT DOCUMENTS

EP　　3 253 104 A1　12/2017
WO　2012/158045 A2　11/2012
(Continued)

OTHER PUBLICATIONS

International Search Report and Written Opinion issued in International Application No. PCT/EP2018/084832 dated Aug. 7, 2019 (11 pages).
(Continued)

*Primary Examiner* — Kodzovi Acolatse
(74) *Attorney, Agent, or Firm* — Rothwell, Figg, Ernst & Manbeck, P.C.

(57)　　　ABSTRACT

There is provided mechanisms for performance degradation handling between a first radio access network node that operates in a first frequency band and provides network access for subscribers of a first mobile network operator and a second radio access network node that operates in a second frequency band and provides network access for subscribers of a second mobile network operator. A method is performed by the first radio access network node. The method comprises identifying performance degradation impacting the network access for the subscribers of the first mobile network operator. The performance degradation is identified as originating from a particular direction relative the first radio access network node and as caused by the second radio access network node. The method comprises providing, towards the second radio access network node, an indication of the performance degradation. The indication specifies the particular direction and identifies the second radio access network node as causing the performance degradation.

17 Claims, 11 Drawing Sheets

(56) References Cited

U.S. PATENT DOCUMENTS

| | | | | |
|---|---|---|---|---|
| 2011/0281600 | A1 | 11/2011 | Tanaka | |
| 2016/0269087 | A1* | 9/2016 | Subramanian | H04B 7/024 |
| 2017/0366981 | A1* | 12/2017 | Takano | H04B 7/0469 |
| 2018/0077632 | A1* | 3/2018 | Frenger | H04W 52/0219 |
| 2018/0262918 | A1 | 9/2018 | Zhao et al. | |
| 2019/0342057 | A1 | 11/2019 | Rico Alvarino et al. | |
| 2019/0364445 | A1* | 11/2019 | Kang | H04W 24/04 |
| 2020/0084642 | A1* | 3/2020 | Siomina | H04W 56/001 |
| 2020/0383118 | A1* | 12/2020 | Park | H04W 72/046 |
| 2021/0100006 | A1* | 4/2021 | Chendamarai Kannan | |
| | | | | H04W 56/001 |
| 2022/0069878 | A1 | 3/2022 | Schuh et al. | |
| 2022/0201527 | A1* | 6/2022 | Matsumura | H04W 24/02 |
| 2022/0263240 | A1* | 8/2022 | Leather | H04B 7/0842 |

FOREIGN PATENT DOCUMENTS

| | | | | |
|---|---|---|---|---|
| WO | | 2017/198293 A1 | 11/2017 | |
| WO | | WO-2020067950 A1 * | 4/2020 | H04B 17/345 |

OTHER PUBLICATIONS

Ofcom, "Notice of coordination procedure required under spectrum access licences for the 2.6 GHz band Coordination with aeronautical radionavigation radar in the 2.7 GHz band", Mar. 2013 (12 pages).

Ofcom, "Protected Radar list", Jan. 2021 (6 pages).

Ericsson, "Background to systematic correction factor for TRP", 3GPP TSG-RAN4 Meeting 88, R4-1810911, Gothenburg, Sweden, Aug. 2018 (5 pages).

International Search Report and Written Opinion dated Oct. 30, 2020 in International Application No. PCT/EP2020/052931 (14 pages).

Nokia et al., "Discussion on NR remote interference mitigation schemes", R1-1813466, 3GPP TSG-RAN WG1 Meeting #95, Spokane, WA, USA, Nov. 12-16, 2018 (4 pages).

ECC Report 281, "Analysis of the suitability of the regulatory technical conditions for 5G MFCN operation in the 3400-3800 MHz band", CEPT, Jul. 6, 2018, https://www.ecodocdb.dk/documenU3360 (99 pages).

ECC Decision (11)06, "Harmonised frequency arrangements and least restrictive technical conditions (LRTC) for mobile/fixed communications networks (MFCN) operating in the band 3400-3800 Mhz", CEPT, Approved Dec. 9, 2011, Amended Oct. 26, 2018 (17 pages).

ECC Decision (05)05, "Harmonised utilization of spectrum for Mobile/Fixed Communications Networks (MFCN) operating within the band 2500-2690 MHz", CEPT, Approved Mar. 18, 2005, Amended Jul. 5, 2019 (21 pages).

ECC Report 296, "National synchronisation regulatory framework options in 3400-3800 MHz: a toolbox for coexistence of MFCNs in synchronised, unsynchronised and semisynchronised operation in 3400-3800 Mhz", CEPT, Mar. 8, 2019 (137 pages).

ECC Draft Report 307, "Toolbox for the most appropriate synchronisation regulatory framework including coexistence of MFCN in 24.25-27.5 GHz in unsynchronised and semisynchronised mode", CEPT (46 pages).

ECC Recommendation (15)01, "Cross-border coordination for mobile / fixed communications networks (MFCN) in the frequency bands: 694-790 MHz, 1427-1518 MHz, 3400-3800 MHz", latest amendment Feb. 14, 2020 (30 pages).

Arcep, Document Submitted for Public Consultation, www.arcep. fr/uploads/tx_gspublication/modalites-attribution-frequences-26GHz-TDD_avril2019.pdf (Apr. 2019) (machine translation) (36 pages).

* cited by examiner (a)

(b)

PERFORMANCE DEGRADATION HANDLING BETWEEN RADIO ACCESS NETWORK NODES

CROSS REFERENCE TO RELATED APPLICATIONS

This application is a 35 U.S.C. § 371 National Stage of International Patent Application No. PCT/EP2020/052931, filed Feb. 6, 2020.

TECHNICAL FIELD

Embodiments presented herein relate to methods, a first radio access network node, a central network node, second radio access network node, computer programs, and a computer program product for performance degradation handling between the first radio access network node and the second radio access network node.

BACKGROUND

In communications networks, there may be a challenge to obtain good performance and capacity for a given communications protocol, its parameters and the physical environment in which the communications network is deployed.

For example, communications in the communications network might utilize either time division duplex (TDD) operation of frequency division duplex (FDD) operation. TDD operation is performed in frequency bands. The number of such frequency bands is increasing, especially at frequencies higher than 10 GHz. High frequency bands might be better suited for advanced, or active, antenna system (AAS) operation when using TDD operation since channel estimation for uplink (i.e., in the direction from s subscriber towards network) and downlink (in the direction from network towards subscribers) can take advantage of reciprocity in the channel.

One potential issue with TDD operation is the need for time-wise (such as with respect to frames or timeslots) synchronization, i.e., time synchronization, between mobile network operators using TDD operation in frequency bands that are in close proximity to each other in order to avoid causing interference or blocking to each other. Synchronized operation with other mobile network operators in the same frequency band requires the different mobile network operators to have the same network radio performance and limits the flexibility for adaptations to traffic changes independently of each other.

Two examples of issues that might result if the operations of the different mobile network operators are not synchronized are interference and blocking. For interference the basic noise level is increased whereas blocking will cause receiver degradation. Blocking occurs when components in the receiver chain is operating outside specified signals level intervals (e.g. the when the analog to digital converter, amplifier or mixer is overloaded). In a situation where components are overloaded the sensitivity of the receiver is degraded. In extreme cases the link is completely lost due to overloading of the analog to digital converter.

For unsynchronized TDD operation the costs for filters in the radio access network nodes or antenna systems might be too high, the size gets too large (especially when AAS is used), too much additional performance loss added, and the need for frequency guard bands makes such unsynchronized TDD operation infeasible.

Hence, there is still a need for an improved handling of unsynchronized TDD operation between radio access network nodes of different mobile network operators.

SUMMARY

An object of embodiments herein is to provide efficient handling of unsynchronized TDD operation between radio access network nodes of different mobile network operators not suffering from the issued note above, or at least where the above noted issues are mitigated or reduced.

According to a first aspect there is presented a method for performance degradation handling between a first radio access network node that operates in a first frequency band and provides network access for subscribers of a first mobile network operator and a second radio access network node that operates in a second frequency band and provides network access for subscribers of a second mobile network operator. The method is performed by the first radio access network node. The method comprises identifying performance degradation impacting the network access for the subscribers of the first mobile network operator. The performance degradation is identified as originating from a particular direction relative the first radio access network node and as caused by the second radio access network node. The method comprises providing, towards the second radio access network node, an indication of the performance degradation. The indication specifies the particular direction and identifies the second radio access network node as causing the performance degradation.

According to a second aspect there is presented a first radio access network node for performance degradation handling between the first radio access network node that is configured to operate in a first frequency band and to provide network access for subscribers of a first mobile network operator and a second radio access network node that is configured to operate in a second frequency band and to provide network access for subscribers of a second mobile network operator. The first radio access network node comprises processing circuitry. The processing circuitry is configured to cause the first radio access network node to identify performance degradation impacting the network access for the subscribers of the first mobile network operator. The performance degradation is identified as originating from a particular direction relative the first radio access network node and as caused by the second radio access network node. The processing circuitry is configured to cause the first radio access network node to provide, towards the second radio access network node, an indication of the performance degradation. The indication specifies the particular direction and identifies the second radio access network node as causing the performance degradation.

According to a third aspect there is presented a computer program for performance degradation handling between a first radio access network node and a second radio access network node. The computer program comprises computer program code which, when run on processing circuitry of the first radio access network node, causes the first radio access network node to perform a method according to the first aspect.

According to a fourth aspect there is presented a method for performance degradation handling between a first radio access network node that operates in a first frequency band and provides network access for subscribers of a first mobile network operator and a second radio access network node that operates in a second frequency band and provides network access for subscribers of a second mobile network operator. The method is performed by a central network node. The method comprises obtaining, from the first radio access network node, an indication of performance degradation as identified by the first radio access network node. The performance degradation impacting the network access for the subscribers of the first mobile network operator. The indication specifies a particular direction relative the first radio access network node from which the performance degradation is identified as originating and identifies the second radio access network node as causing the performance degradation. The method comprises forwarding the indication of the performance degradation towards the second radio access network node.

According to a fifth aspect there is presented a central network node for performance degradation handling between a first radio access network node that operates in a first frequency band and provides network access for subscribers of a first mobile network operator and a second radio access network node that operates in a second frequency band and provides network access for subscribers of a second mobile network operator. The central network node comprises processing circuitry. The processing circuitry is configured to cause the central network node to obtain, from the first radio access network node, an indication of performance degradation as identified by the first radio access network node. The performance degradation impacting the network access for the subscribers of the first mobile network operator. The indication specifies a particular direction relative the first radio access network node from which the performance degradation is identified as originating and identifies the second radio access network node as causing the performance degradation. The processing circuitry is configured to cause the central network node to forward the indication of the performance degradation towards the second radio access network node.

According to a sixth aspect there is presented a computer program for performance degradation handling between a first radio access network node and a second radio access network node. The computer program comprises computer program code which, when run on processing circuitry of a central network node, causes the central network node to perform a method according to the fourth aspect.

According to a seventh aspect there is presented a method for performance degradation handling between a first radio access network node that operates in a first frequency band and provides network access for subscribers of a first mobile network operator and a second radio access network node that operates in a second frequency band and provides network access for subscribers of a second mobile network operator. The method is performed by the second radio access network node. The method comprises obtaining an indication of performance degradation as identified by the first radio access network node. The performance degradation impacting the network access for the subscribers of the first mobile network operator. The indication specifies a particular direction relative the first radio access network node from which the performance degradation is identified as originating and identifies the second radio access network node as causing the performance degradation. The method comprises reducing beamforming gain in the particular direction by adjusting beamforming parameter values as applied when providing network access for the subscribers of the second mobile network operator.

According to an eight aspect there is presented a second radio access network node for performance degradation handling between a first radio access network node that is configured to operate in a first frequency band and to provide network access for subscribers of a first mobile network operator and the second radio access network node that is configured to operate in a second frequency band and to provide network access for subscribers of a second mobile network operator. The second radio access network node comprises processing circuitry. The processing circuitry is configured to cause the second radio access network node to obtain an indication of performance degradation as identified by the first radio access network node. The performance degradation impacting the network access for the subscribers of the first mobile network operator. The indication specifies a particular direction relative the first radio access network node from which the performance degradation is identified as originating and identifies the second radio access network node as causing the performance degradation. The processing circuitry is configured to cause the second radio access network node to reduce beamforming gain in the particular direction by adjusting beamforming parameter values as applied when providing network access for the subscribers of the second mobile network operator.

According to a tenth aspect there is presented a computer program for performance degradation handling between a first radio access network node and a second radio access network node, the computer program comprising computer program code which, when run on processing circuitry of the second radio access network node, causes the second radio access network node to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously, these aspects provide efficient handling of unsynchronized TDD operation between radio access network nodes of different mobile network operators.

Advantageously, these aspects enable co-existence of radio access network nodes belonging to different mobile network operators within the coverage regions of the radio access network nodes.

Advantageously, the proposed handling of unsynchronized TDD operation between radio access network nodes of different mobile network operators does not suffering from the issued note above.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
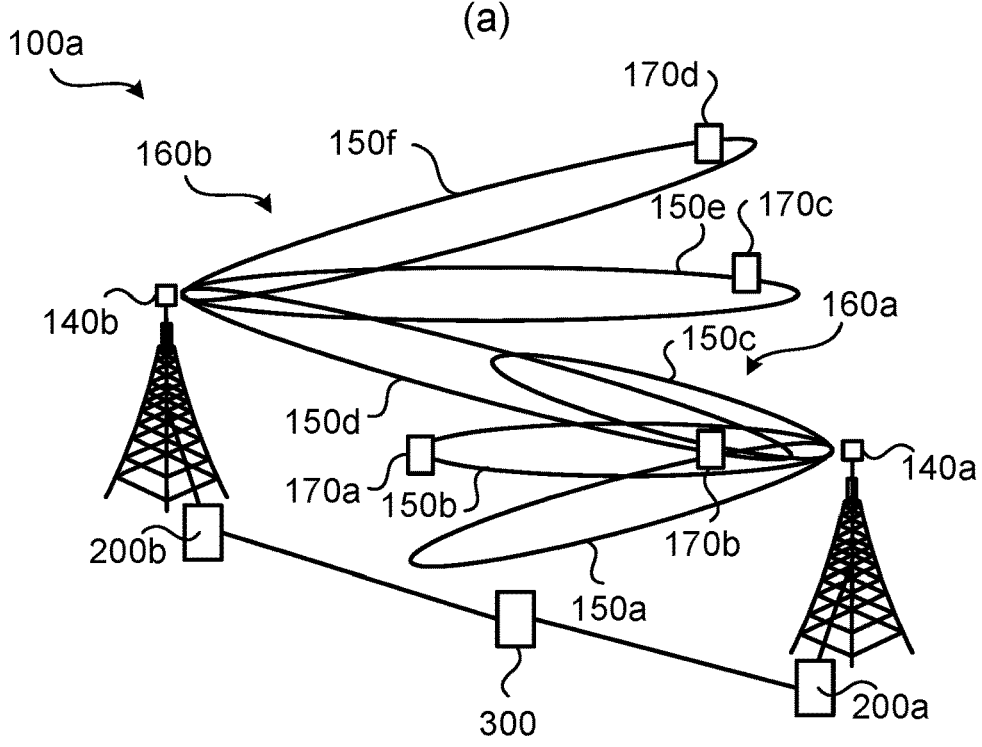
FIG. 1 is a schematic diagram illustrating a communication network according to embodiments.
Figure 1:
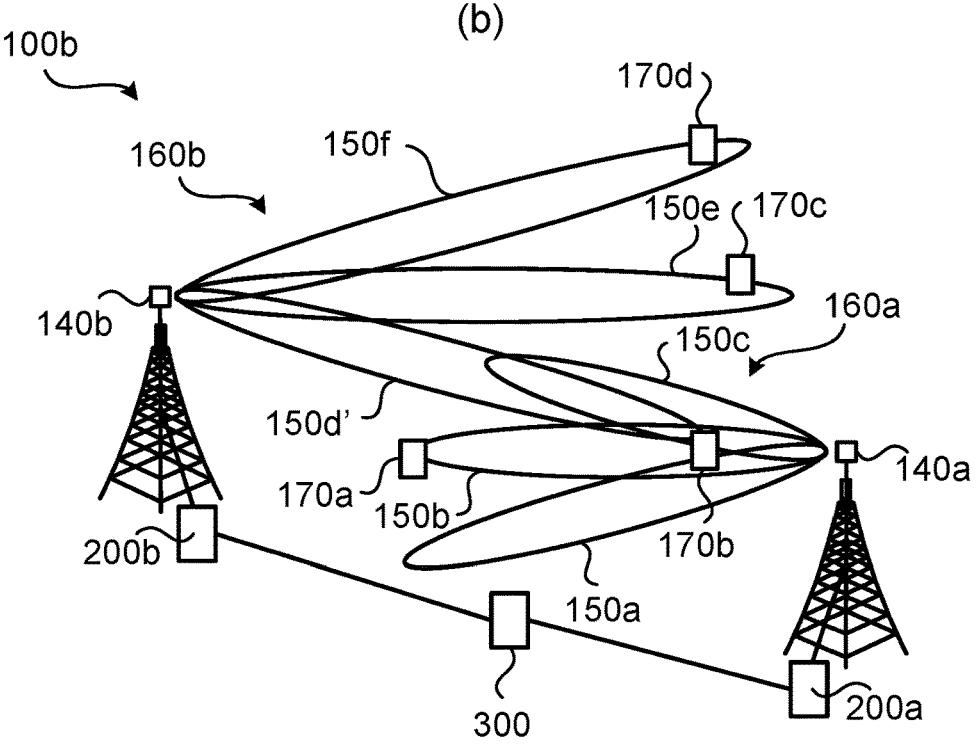

FIG. 1(*a*) and FIG. 1(*b*) are schematic diagrams illustrating a communication network 100*a*, 100*b* where embodiments presented herein can be applied. The communication network 100*a*, 100*b* could be a third generation (3G) telecommunications network, a fourth generation (4G) telecommunications network, or a fifth (5G) telecommunications network and support any 3GPP telecommunications standard, where applicable.

The communication network 100*a*, 100*b* comprises radio access network nodes 200*a*, 200*b* configured to provide network access to subscribers 170*a*, 170*b*, 170*c*, 170*d*. It is assumed that subscriber 170*a* is served by radio access network node 200*a* and that subscribers 170*b*, 170*c*, 170*d* are served by radio access network node 200*b*.

Examples of radio access network nodes 200*a*, 200*b* are radio base stations, base transceiver stations, Node Bs, evolved Node Bs, g NBs, access points, access nodes, and backhaul nodes. Examples of subscribers 170*a*, 170*b*, 170*c*, 170*d* are wireless devices, mobile stations, mobile phones, handsets, wireless local loop phones, user equipment (UE), smartphones, laptop computers, tablet computers, network equipped sensors, network equipped vehicles, and so-called Internet of Things devices.

Each of the radio access network nodes 200*a*, 200*b* belongs to its own mobile network operator. Each radio access network node 200*a*, 200*b* comprises, is collocated with, is integrated with, or is in operational communications with, a transmission and reception point (TRP) 140*a*, 140*b*.

The radio access network nodes 200*a*, 200*b* (via their TRPs 140*a*, 140*b*) and the subscribers 170*a*, 170*b*, 170*c*, 170*d* are configured to communicate with each other in beams 150*a*:150*f*, where beams 150*a*:150*c* as generated at TRP 140*a* give rise to spatial antenna beam pattern 160*a* and the beams 150*d*:150*f* as generated at TRP 140*b* give rise to spatial antenna beam pattern 160*b*. In some examples the radio access network nodes 200*a*, 200*b* are operatively connected to a central network node 300. Further aspects of the central network node 300 will be disclosed below.

As noted above there is still a need for an improved handling of unsynchronized TDD operation between radio access network nodes 200*a*, 200*b* of different mobile network operators.

In more detail, the following issues might occur: Synchronization of radio access network nodes 200*a*, 200*b* of different mobile network operators might require additional complexity in the communication network 100*a*, 100*b*. Mobile network operators might be forced to agree on the uplink versus downlink ratio for their whole network with other mobile network operators without the possibility to adapt to the demands of their own subscribers 170*a*, 170*b*, 170*c*, 170*d*, even within their own network. Mobile network operators might be forced to have the same performance and operation as other mobile network operators. Efficient use (such as in terms of deployment and/or coverage) of the frequency bands might be limited if only synchronized operation is allowed. Adaptation and flexibility with regards to changing traffic demands might be limited.

As an illustrative example, in FIG. 1(*a*) the transmission from TRP 140*b* in beam 150*d* causes performance degradation for TRP 140*a*. If the beamforming gain of beam 150*d* is reduced to that of beam 150*d'* in the illustrative example of FIG. 1(*b*) there will not be any such performance degradation and subscriber 170*b* would still be served via TRP 140*b*.

Radio access network node 200*a* will hereinafter be denoted a first radio access network node 200*a* and radio access network node 200*b* will hereinafter be denoted a second radio access network node 200*b*. However, this does not imply any hierarchical relation between these or any other radio access network nodes.

The embodiments disclosed herein therefore relate to mechanisms performance degradation handling between the first radio access network node 200*a* and the second radio access network node 200*b*. In order to obtain such mechanisms there is provided a first radio access network node 200*a*, a method performed by the first radio access network node 200*a*, a computer program product comprising code, for example in the form of a computer program, that when run on processing circuitry of the first radio access network node 200*a*, causes the first radio access network node 200*a* to perform the method. In order to obtain such mechanisms there is further provided a central network node 300, a method performed by the central network node 300, and a computer program product comprising code, for example in the form of a computer program, that when run on processing circuitry of the central network node 300, causes the central network node 300 to perform the method. In order to obtain such mechanisms there is further provided a second radio access network node 200*b*, a method performed by the second radio access network node 200*b*, and a computer program product comprising code, for example in the form of a computer program, that when run on processing circuitry of the second radio access network node 200*b*, causes the second radio access network node 200*b* to perform the method.

It is assumed that the first radio access network node 200*a* is configured to operate in a first frequency band and to provide network access for subscribers 170*a* of a first mobile network operator and that the second radio access network node 200*b* is configured to operate in a second frequency band and to provide network access for subscribers 170*b*, 170*c*, 170*d* of a second mobile network operator.

In some embodiments, the first radio access network node 200*a* and the second radio access network node 200*b* are configured for TDD operation when providing network access to their subscribers 170*a*, 170*b*, 170*c*, 170*d*. In some embodiments, the first frequency band and the second frequency band are one and the same frequency band or at least partly overlapping with each other, whereas in other embodiments the first frequency band and the second frequency band are adjacent each other. In some embodiments, the first frequency band and the second frequency band are licensed, lightly-licensed, or unlicensed frequency bands.

Figure 2:
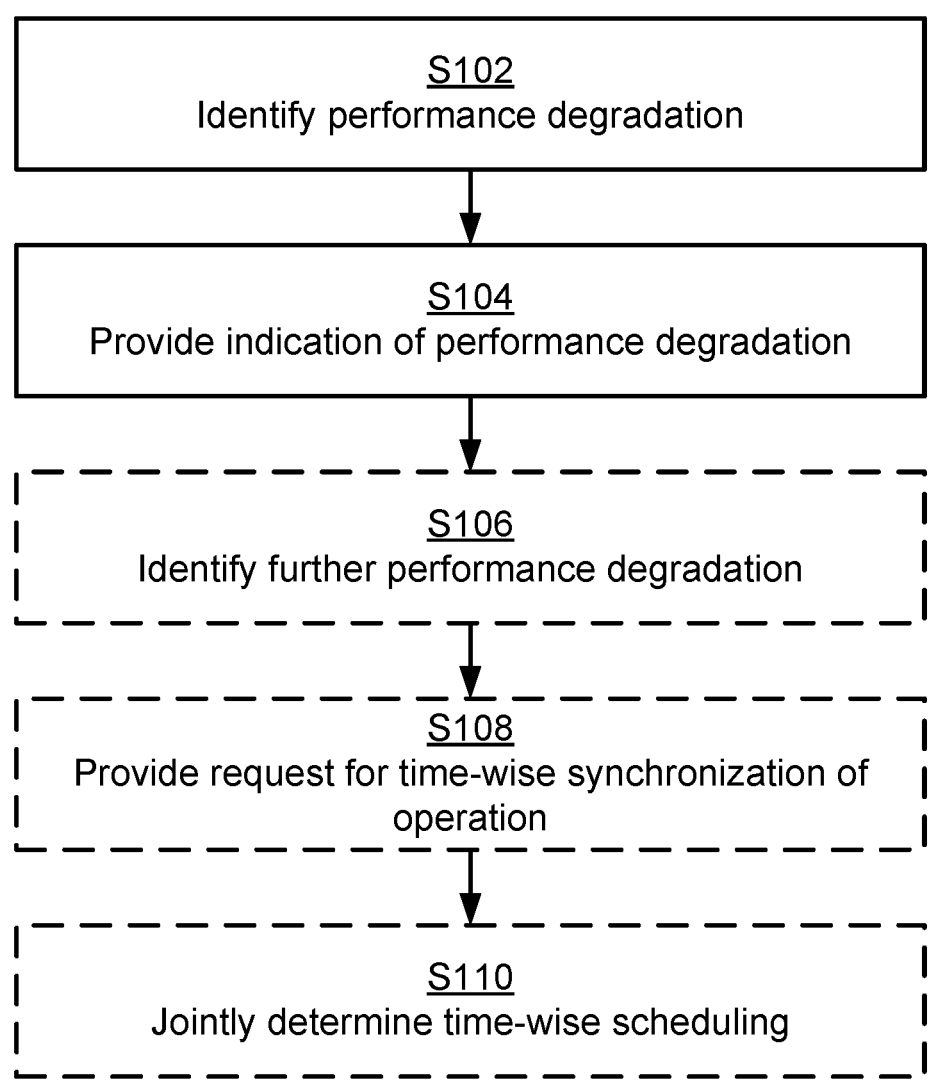
FIGS. 2, 3, 4, and 6 are flowcharts of methods according to embodiments.

Reference is now made to FIG. 2 illustrating a method for performance degradation handling between a first radio access network node 200*a* and a second radio access network node 200*b* as performed by the first radio access network node 200*a* according to an embodiment.

It is assumed that the first radio access network node 200*a* experiences performance degradation and that such performance degradation is detected. Thus, the first radio access network node 200*a* is configured to perform action S102:

S102: The first radio access network node 200*a* identifies performance degradation impacting the network access for the subscribers 170*a* of the first mobile network operator. The performance degradation is identified as originating from a particular direction relative the first radio access network node 200*a* and as caused by the second radio access network node 200*b*.

In this respect, the performance degradation might originate from more than one particular direction and all those directions might thus be identified. Further in this respect, the performance degradation might be either due to unwanted emission or due to blocking. Depending on the interference or blocking level the performance degradation might be sever and communication in the whole cell as served by TRP 140*a* might be interrupted. The radio access network node that causes the performance degradation is then informed. In particular, the first radio access network node 200*a* is configured to perform action S104:

S104: The first radio access network node 200*a* provides, towards the second radio access network node 200*b*, an indication of the performance degradation. The indication specifies the particular direction and identifies the second radio access network node 200*b* as causing the performance degradation.

Embodiments relating to further details of performance degradation handling between a first radio access network node 200*a* and a second radio access network node 200*b* as performed by the first radio access network node 200*a* will now be disclosed.

There may be different ways for the first radio access network node 200*a* to in action S102 detect the performance degradation.

In this respect, the receiver in the first radio access network node 200*a* might act as a spectrum analyzer in to detect possible interference or in-band blocking. Such analysis might not be performed during normal operation as it might consume too many resources and hardware support.

Such detection might be performed during initial deployment or in offline mode. The detection might be triggered when the first radio access network node 200*a* detects that the noise in receive mode for frequency bands where TDD unsynchronized operation is used is higher than a noise threshold value. Hence, the first radio access network node 200*a* might be configured to monitor its noise floor at either regular intervals or continuously.

Further, the first radio access network node 200*a* might be configured to perform further measurements when detecting that the noise is higher than the noise threshold value. Particularly, according to an embodiment, the identifying in S102 of the performance degradation involves performing measurements throughout the first frequency band for synchronization and/or broadcast signals carrying an identifier of the second radio access network node 200*b*. Such measurements might be performed in order for the first radio access network node 200*a* to differentiate between interference and/or blocking sources in-band, from other frequency bands, from other adjacent services, etc. In principle the radio access network node 200*a* might perform the same procedures as a subscriber would do in order to detect a cell. Broadcast channels, synchronization channels, and system information might by the first radio access network node 200*a* be decoded from which e.g. downlink timing and TDD uplink/downlink configuration (of a potential interferer) can be obtained. Mobile network operator related information might also be obtained. Authentication is not needed for acquisition of this information. As an example, TDD configuration, or other types of common cell-specific patterns, used by the second radio access network node 200*b* might be present in the system, such as in system information block 1 (SIB1) for LTE. If information of common cell-specific patterns cannot be found, then it is likely that the second radio access network node 200*b* is operating with a flexible uplink/downlink pattern. The first radio access network node 200*a* is thus capable of distinguishing signals as received from its own subscribers 170*a* from signals received from radio access network nodes of other mobile network operators by decoding information that does not require authentication and thus obtain mobile network operator related information.

Further aspects of how the first radio access network node 200*a* might detect the performance degradation in action S102 will now be disclosed.

For example, if the first radio access network node 200*a* detects an increased level of noise that follows a typical downlink transmission pattern, this could be an indication that transmission from another radio access network node causes the performance degradation.

For example, if there are two or more potential aggressor radio access network nodes that are closely positioned, or even collocated, the first radio access network node 200*a* might perform measurements over a longer period of time than one cycle of the downlink transmission pattern in order to determine which one of the radio access network nodes that is the aggressor radio access network node. This since beamforming statistic and resulting interference towards the first radio access network node 200*a* (taking the role as victim radio access network node) will be correlated only for the radio access network node causing the higher interference.

Yet further aspects of how the first radio access network node 200*a* might detect the performance degradation in action S102 will be disclosed below with reference to FIG. 5.

In some aspects, the first radio access network node 200*a* further reports the point in time when the performance degradation occurred. Such information might then be used by the second radio access network node 200*b* to better identify what action to take to possibly reduce the performance degradation experienced by the first radio access network node 200*a*. Particularly, according to an embodiment, the identifying in action S102 of the performance degradation involves determining a time reference as to time of occurrence of the performance degradation.

The indication of performance degradation then further comprises the time reference. Further, the identifying in action S102 might involve low-pass filtering such that performance degradation caused by temporal spikes are not reported. Hence, the first radio access network node 200*a* might be configured to first verify that the performance degradation has occurred during a certain amount of time before the indication of performance degradation is provided in action S104.

In general terms, the performance degradation is caused by signal transmission from the second radio access network node 200*b*.

There could be different ways for the first radio access network node 200*a* to determine the particular direction (i.e., the direction in which performance degradation is caused). The following aspects, embodiments, and examples are equally applicable for determining more than one particular direction in which performance degradation is caused.

In some aspects, the particular direction is determined by means of estimating the angle of arrival (AoA) of the signal transmission from the second radio access network node 200*b*.

Particularly, according to an embodiment, the particular direction relative the first radio access network node 200*a* is identified by the first radio access network node 200*a* estimating the angle of arrival of the signal transmission. In order to estimate the AoA of incident signals, a directional antenna, such as an adaptive phased array of two or more antenna elements, might be required at the TRP 140*a* of the first radio access network node 200*a*. One way for the first radio access network node 200*a* to estimate the AoA is to measure the phase difference between the signals, when impinging on different antenna elements, and convert this to an AoA estimate.

In some aspects, the first radio access network node 200*a* is configured to provide network access for subscribers 170*a* of the first mobile network operator in a set of beams 150*a*:150*c*. The particular direction might then be determined by means of measurements in the beams 150*a*:150*c*. Particularly, according to an embodiment, the particular direction relative the first radio access network node 200*a* is identified by in which at least one of the beams 150*a*:150*c* the signal transmission is received. The beams 150*a*:150*c* might be defined as a set of pre-defined beams (also known as a grid of beams) in the uplink processing at the first radio access network node 200*a*. Then the beam that produces most noise degradation can be tied to a certain direction. This direction then defines the particular direction in which the performance degradation is experienced.

Further, the first radio access network node 200*b* might be aided by the central network node 300 to determine the particular direction in which the performance degradation is experienced for example in scenarios where the central network node 300 keeps information of the deployment of the radio access network nodes 200*a*, 200*b* and their TRPs 140*a*, 140*b* (such as where the TRPs 140*a*, 140*b* are geographically located and which spatial antenna beam pattern is used at each TRP 140*a*, 140*b*. Such information might be sufficient for the first radio access network node 200*a* to identify the particular direction in which the performance degradation is experienced.

in some aspects, the first radio access network node 200*a* still identifies further performance degradation even upon having provided, towards the second radio access network node 200*b*, the indication of the performance degradation, as in action S104. This might be the case for example when the first radio access network node 200*a* and the second radio access network node 200*b* are located geographically close to each other, when it is difficult for the first radio access network node 200*a* to with high accuracy identify the particular direction in which the performance degradation is experienced (e.g., due to reflections), when performance degradation is experienced in more than one direction, etc. The first radio access network node 200*a* might then be configured to timewise synchronize its operation with the second radio access network node 200*b*. Particularly, according to an embodiment, the first radio access network node 200*a* is configured to perform (optional) actions S106, S108, S110:

S106: The first radio access network node 200*a* identifies further performance degradation impacting the network access for the subscribers 170*a* of the first mobile network operator. The further performance degradation is identified as caused by the second radio access network node 200*b*.

S108: The first radio access network node 200*a* provides, towards the second radio access network node 200*b*, a request for time-wise synchronization of operation with the second radio access network node 200*b*.

S110: The first radio access network node 200*a* jointly determines, with the second radio access network node 200*b*, time-wise scheduling in the particular direction.

The first radio access network node 200*a* and the second radio access network node 200*b* might thereby be configured to jointly determine a fallback uplink/downlink ratio for synchronized or semi-synchronized operation.

Additionally or alternatively, in scenarios where the first radio access network node 200*a* is, due to the performance degradation, unable to communicate in the particular direction (e.g. to successfully set up an emergency call for the subscriber 170*a*) because the second radio access network node 200*b* does not reduce its beamforming gain in the particular direction fast enough (see action S304 below) the communication might temporarily be set up in, or be transferred to, another frequency band.

There could be different types of performance degradations. Particularly, according to an embodiment, the performance degradation is either defined as interference or blocking.

There could be different ways for the first radio access network node 200*a* to provide the indication of performance degradation towards the second radio access network node 200*b* in action S104. The indication could be provided by the first radio access network node 200*a* towards the second radio access network node 200*b* via the central network node 300. Particularly, according to an embodiment, the indication is provided to the central network node 300. However, in other embodiments the indication of performance degradation is provided directly to the second radio access network node 200*b* itself, for example using proprietary signalling, or other type of signalling. In this respect, a communication protocol for the proprietary signalling might therefore be set up between the first mobile network operator and the second mobile network operator. This communication protocol might be based on Morse signalling or other types of signalling, optionally using an agreed order of repetition. Proprietary signalling might thus be used for the first radio access network node 200a to inform the second radio access network node 200b that performance degradation is caused, the direction in which the performance degradation is caused, and/or the amount of performance degradation caused.

Figure 3:
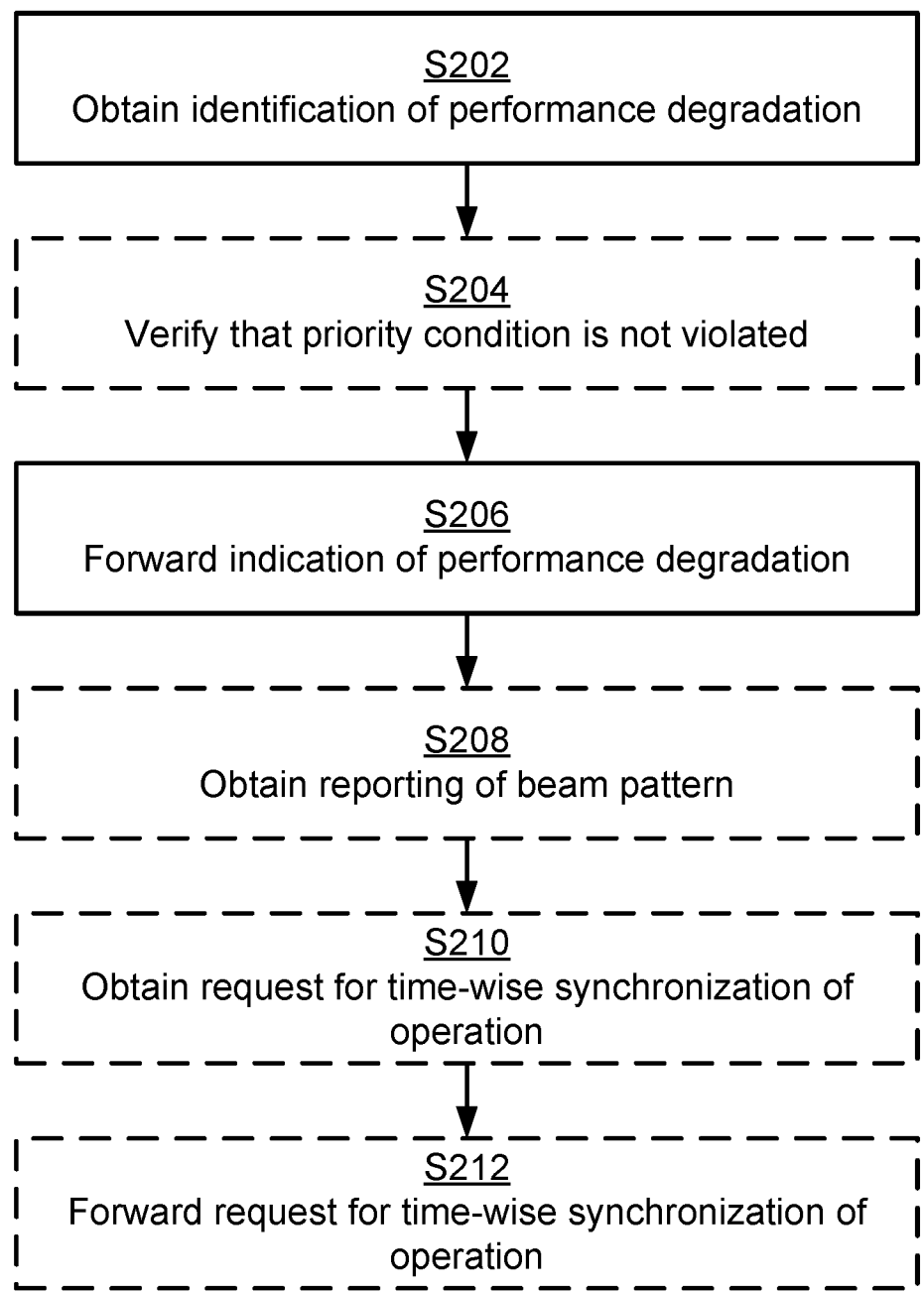

Reference is now made to FIG. 3 illustrating a method for performance degradation handling between a first radio access network node 200a and a second radio access network node 200b as performed by the central network node 300 according to an embodiment.

In some aspects, the central network node 300 receives reportings of performance degradation as caused by an aggressor radio access network node from a victim radio access network node and forwards the reportings to the aggressor radio access network node. In particular, the central network node 300 is configured to perform action S202:

S202: The central network node 300 obtains, from the first radio access network node 200a, an indication of performance degradation as identified by the first radio access network node 200a.

As disclosed above, the performance degradation impacts the network access for the subscribers 170a of the first mobile network operator. As further disclosed above, the indication specifies a particular direction relative the first radio access network node 200a from which the performance degradation is identified as originating and identifies the second radio access network node 200b as causing the performance degradation.

S206: The central network node 300 forwards the indication of the performance degradation towards the second radio access network node 200b.

Embodiments relating to further details of performance degradation handling between a first radio access network node 200a and a second radio access network node 200b as performed by the central network node 300 will now be disclosed.

In some aspects the central network node 300 handles information for radio access network nodes 200a, 200b and the used frequency band(s) such as: location of each radio access network node 200a, 200b, antenna height of each radio access network nodes 200a, 200b (i.e., vertical placement of each TRP 140a, 140b), directional coverage of each radio access network node 200a, 200b, spatial filter masks as applied by each radio access network nodes 200a, 200b, etc.

In some aspects, the central network node 300 is configured to in real-time handle traffic policies. In order to do so the central network node 300 might be configured to utilize neural network technology, artificial intelligence and machine learning technologies, according to which license conditions issued by regulator, bi- or multi-lateral traffic policy agreements between different mobile network operators, etc. are implemented to enable the central network node 300 to control and resolve conflicts in the traffic scenario in real time as they occur. The traffic policy agreements might specify traffic type (i.e. voice, non-time-critical data, time-critical data etc.) and/or which mobile network operator should have priority in a conflict situation. Priority mechanisms might be be made part of end-user subscription conditions such that different subscribers 170a, 170b, 170c, 170d would be provided different quality of service due to traffic prioritization in resource limited scenarios, where un-synchronized operation is one option. Particularly, according to an embodiment, the central network node 300 is configured to perform (optional) action S204, before forwarding the indication of the performance degradation in action S206:

S204: The central network node 300 verifies that reducing beamforming gain by the second radio access network node 200b in the particular direction would not violate any priority condition for the second mobile network operator.

As disclosed above, in some aspects the first radio access network node 200a further reports the point in time when the performance degradation occurred. Particularly, according to an embodiment, the indication of the performance degradation as obtained in action S202 further comprises a time reference as to the time of occurrence of the performance degradation.

As will be further disclosed below, in some aspects the second radio access network node 200b updates its spatial antenna beam pattern 160b according to which the second radio access network node 200b provides network access for its subscribers and reports the spatial antenna beam pattern 160b' as updated to a central network node 300. Hence, according to an embodiment, the central network node 300 is configured to perform (optional) action S208:

S208: The central network node 300 obtains, from the second radio access network node 200b, reporting of a spatial antenna beam pattern 160b' as updated by beamforming parameter values being adjusted. The second radio access network node 200b then provides network access for its subscribers 170b, 170c, 170d according to the spatial antenna beam pattern 160b' as updated.

As will be further disclosed below, the spatial antenna beam pattern 160b' might be provided with a timestamp.

Further, as disclosed above, the central network node 300 might keep information of the deployment of the radio access network nodes 200a, 200b and their TRPs 140a, 140b (such as where the TRPs 140a, 140b are geographically located (for example in terms of coordinates of a Global Navigation Satellite System; GNSS) and which spatial antenna beam pattern is used at each TRP 140a, 140b. In this respect the central network node 300 might further keep information of antenna height of each TRP 140a, 140b, boresight, antenna tilt, etc.

In some aspects the central network node 300 is configured to orchestrate, or at least to be involved in, synchronized and/or semi-synchronized operation between the first radio access network node 200a and the second radio access network node 200b as a fallback option when un-synchronized operation between the first radio access network node 200a and the second radio access network node 200b does not work (i.e., in situations where performance degradation still occurs).

Particularly, according to an embodiment, the central network node 300 is configured to perform (optional) actions S210 and S212:

S210: The central network node 300 obtains, from the first radio access network node 200a, a request for time-wise synchronization of operation with the second radio access network node 200b; and S212: The central network node 300 forwards the request towards the second radio access network node 200b.

The first radio access network node 200a and the second radio access network node 200b might then, as in above action S110 and below action S310, jointly determine time-wise scheduling in the particular direction where performance degradation of the first radio access network node 200a is caused by the second radio access network node 200b.

Figure 4:
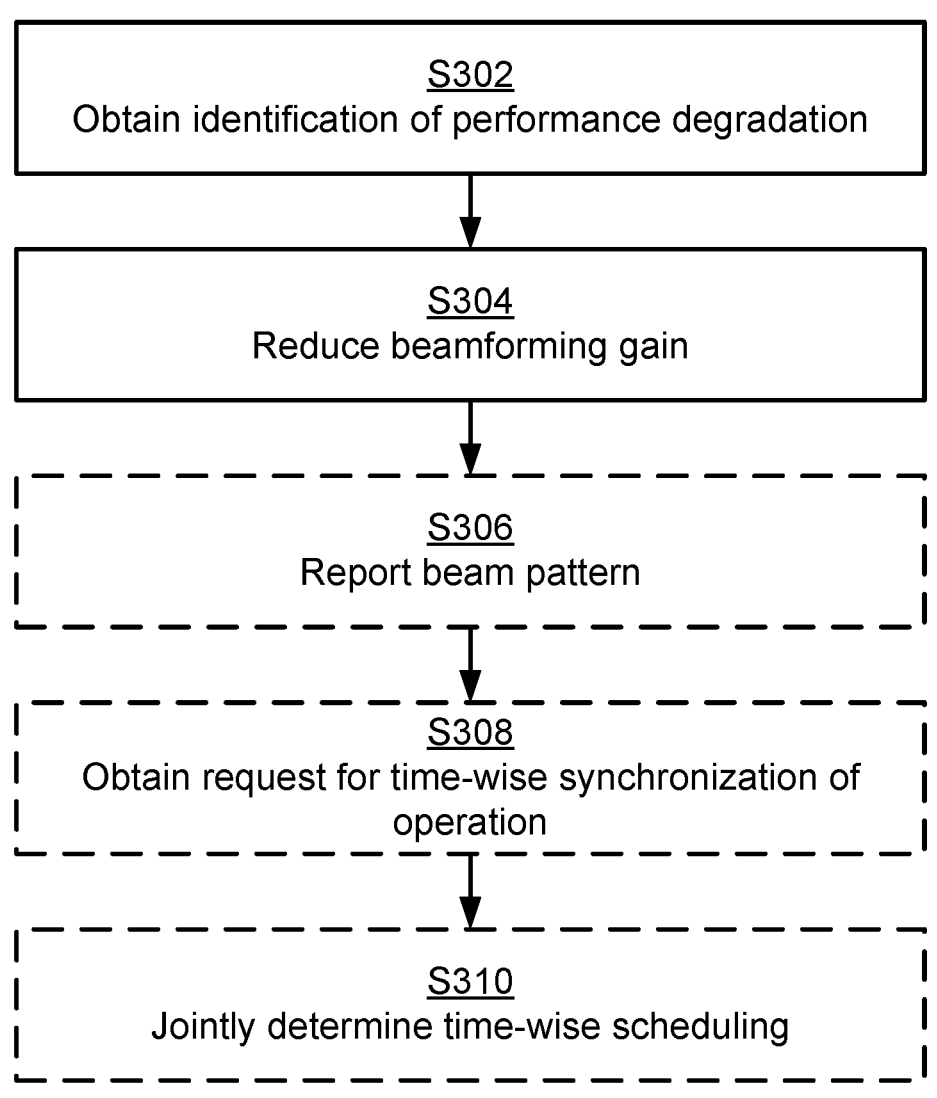

Reference is now made to FIG. 4 illustrating a method for performance degradation handling between a first radio access network node 200*a* and a second radio access network node 200*b* as performed by the second radio access network node 200*b* according to an embodiment.

It is assumed that operation of the second radio access network node 200*b* causes performance degradation of the first radio access network node 200*a*. In particular, the second radio access network node 200*b* is configured to perform action S302:

S302: The second radio access network node 200*b* obtains an indication of performance degradation as identified by the first radio access network node 200*a*. As disclosed above, the performance degradation impacts the network access for the subscribers 170*a* of the first mobile network operator. As disclosed above, the indication specifies a particular direction relative the first radio access network node 200*a* from which the performance degradation is identified as originating and identifies the second radio access network node 200*b* as causing the performance degradation.

The second radio access network node 200*b* then takes an appropriate action with the objective to reduce the caused performance degradation. In particular, the second radio access network node 200*b* is configured to perform action S304:

S304: The second radio access network node 200*b* reduces beamforming gain in the particular direction by adjusting beamforming parameter values as applied when providing network access for the subscribers 170*b*, 170*c*, 170*d* of the second mobile network operator.

Embodiments relating to further details of performance degradation handling between a first radio access network node 200*a* and a second radio access network node 200*b* as performed by the second radio access network node 200*b* will now be disclosed.

As disclosed above, in some aspects the first radio access network node 200*a* further reports the point in time when the performance degradation occurred. Particularly, according to an embodiment, the indication of the performance degradation as obtained in action S302 further comprises a time reference as to the time of occurrence of the performance degradation.

This information might then be used by the second radio access network node 200*b* to determine which beamforming parameter values were used at the point in time when the performance degradation was caused and thus to better identify how to adjust the beamforming parameter values, and thus ultimately what action to take to possibly reduce the performance degradation experienced by the first radio access network node 200*a*.

There may be different ways for the second radio access network node 200*b* to adjust the beamforming parameter values as applied when providing network access for the subscribers 170*b*, 170*c*, 170*d* of the second mobile network operator. In some aspects the second radio access network node 200*b* is configured to adjust the beamforming parameter values by means of applying a spatial filter mask that is based on the direction towards the first radio access network node 200*a*. Particularly, according to an embodiment, the beamforming parameter values are adjusted by application of a spatial filtering mask to the beamforming parameter values. The spatial filter mask is based on the actual deployment and real-time operation of the TRP 140*b* of the second radio access network node 200*b*. The spatial filtering mask is designed to cause the transmission of the second radio access network node 200*b* in the particular direction to be nulled, or at least suppressed. This applies to main lobes as well as side lobes of the beams generated by the TRP 140*b* of the second radio access network node 200*b*.

In some aspects, upon having adjusted the beamforming parameter values and thus updated its spatial antenna beam pattern, the second radio access network node 200*b* informs the central network nodes 300 of the thus updated spatial antenna beam pattern 160*b*'. Particularly, according to an embodiment, a spatial antenna beam pattern 160*b* according to which the second radio access network node 200*b* provides network access for its subscribers 170*b*, 170*c*, 170*d* is updated by the beamforming parameter values being adjusted. In this embodiment the second radio access network node 200*b* might then further be configured to perform (optional) action S306:

S306: The second radio access network node 200*b* reports the spatial antenna beam pattern 160*b*' as updated to a central network node 300.

In some aspects, each spatial antenna beam pattern is associated with its own timestamp, where the timestamp specifies the point in time when its spatial antenna pattern was deployed and/or for low long period of time its spatial antenna pattern is to be deployed (or was deployed if the timestamp has expired). Use of such timestamps might allow the radio access network nodes to adapt its spatial antenna beam patterns to possible environmental changes for a predetermined amount of time, such as until a timer expires, and might limit the amount of time that spatial filtering masks are not applied simultaneously in too many directions. Information of the timestamp might then be provided to the central network node 300. Particularly, according to an embodiment, the spatial antenna beam pattern 160*b*' as updated is provided with a timestamp before being reported to the central network node 300.

Although the second radio access network node 200*b* in action 5304 reduces its beamforming gain in the particular direction, in some aspects the first radio access network node 200*a* still identifies further performance degradation, as disclosed above with reference to action S106. Particularly, according to an embodiment, the second radio access network node 200*b* is configured to perform (optional) actions S308 and S310:

S308: The second radio access network node 200*b* obtains a request for time-wise synchronization of operation with the second radio access network node 200*b*.

S310: The second radio access network node 200*b* jointly determines, with the first radio access network node 200*a*, time-wise scheduling in the particular direction.

As disclosed above, the first radio access network node 200*a* and the second radio access network node 200*b* might thereby be configured to jointly determine a fallback uplink/downlink ratio for synchronized or semi-synchronized operation.

There could be different ways for the second radio access network node 200*b* to obtain the indication of performance degradation in action S302. The indication originates from the first radio access network node 200*a* but could be provided by the first radio access network node 200*a* towards the second radio access network node 200*b* via the central network node 300. Particularly, according to an embodiment, the indication is obtained from the central network node 300. However, in other embodiments the indication of performance degradation is obtained directly from the first radio access network node 200*a* itself, for example using proprietary signalling, as disclosed above.

Figure 5:
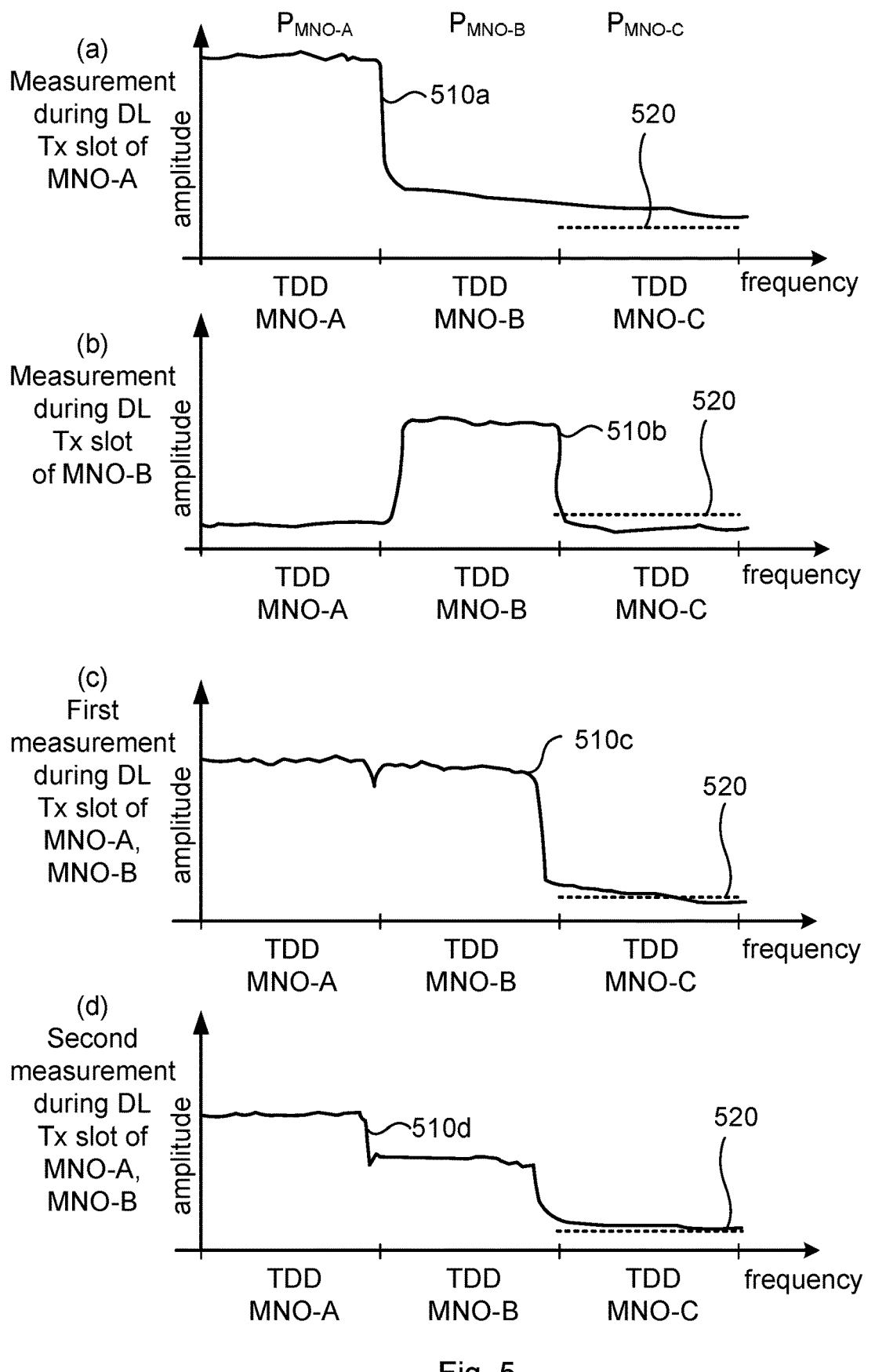
FIG. 5 is a schematic illustration of frequency spectra according to embodiments.

With reference to FIG. 5, examples will be shown how a radio access network node, by making frequency spectrum measurements, might detect the source causing interference or blocking. In more detail, FIG. 5 show two example cases where interferences is caused by one or more radio access network node, where each radio access network node belongs to its own mobile network operator (denoted MNO-A, MNO-B, MNO-C), and where each mobile network operator is assigned its own frequency band, as illustrated by MNO-A, MNO-B, MNO-C along the frequency axis. In the example of FIG. 5 it is for illustrative purposes assumed that the radio access network node, or TRP, of MNO-A takes the role of aggressor and the radio access network node, or TRP, of MNO-C takes the role of victim.

It is assumed that the radio access network node of MNO-C is capable of performing measurements throughout the frequency range and that the frequency spectrum as measured by this radio access network node is represented at reference numerals 510*a*, 510*b*, 510*c*, 510*d*. The noise floor for the radio access network node of MNO-C is identified at reference numeral 520.

FIG. 5 at (a) and (b) illustrates a first example case. In this first example the operation of the radio access network nodes of MNO-A and MNO-B is unsynchronized. This enables the radio access network node of MNO-C to perform measurements at downlink transmission times of MNO-A and MNO-B, respectively. Performance degradation is experienced by the radio access network nodes of MNO-C at (a) but not at (b). In the first example, MNO-A could thus be identified as the aggressor since the interference level, as defined by the noise rise, measured by the radio access network node of MNO-C is directly correlated with the downlink transmission time of MNO-A.

FIG. 5 at (c) and (d) illustrates a second example case. In this first example the operation of the radio access network nodes of MNO-A and MNO-B is synchronized, possibly operating from the same site. Performance degradation is experienced by the radio access network nodes of MNO-C at (c) as well as at (b). Since the operation of the radio access network nodes of MNO-A and MNO-B is synchronized, the radio access network node of MNO-C need to perform measurements of two or more downlink transmission times of MNO-A and MNO-B, such that, if possible, capture effects of independent beam steering at the TRPs of the radio access network nodes of MNO-A and MNO-B that will reveal the correlation to the detected interference and from that identify the aggressor.. Furthermore, the actual detailed spectrum may be measured as the unwanted emission will show a uniform trend if the interference is from one of the MNO operators MNO-A, MNO-B. For example, measuring over the whole frequency band could give details as interference from the aggressor would relate to the aggressor's bandwidth. Scanning the whole frequency band could give information of whether the interference is originating from within one single part of the frequency band or not. Such unwanted emission will have a uniform correlated slope from the aggressor. Intermodulation products from other bands or interference sources will not show such uniform unwanted emission or spurious emission. In the second example, MNO-A could thus be identified as the aggressor.

Figure 6:
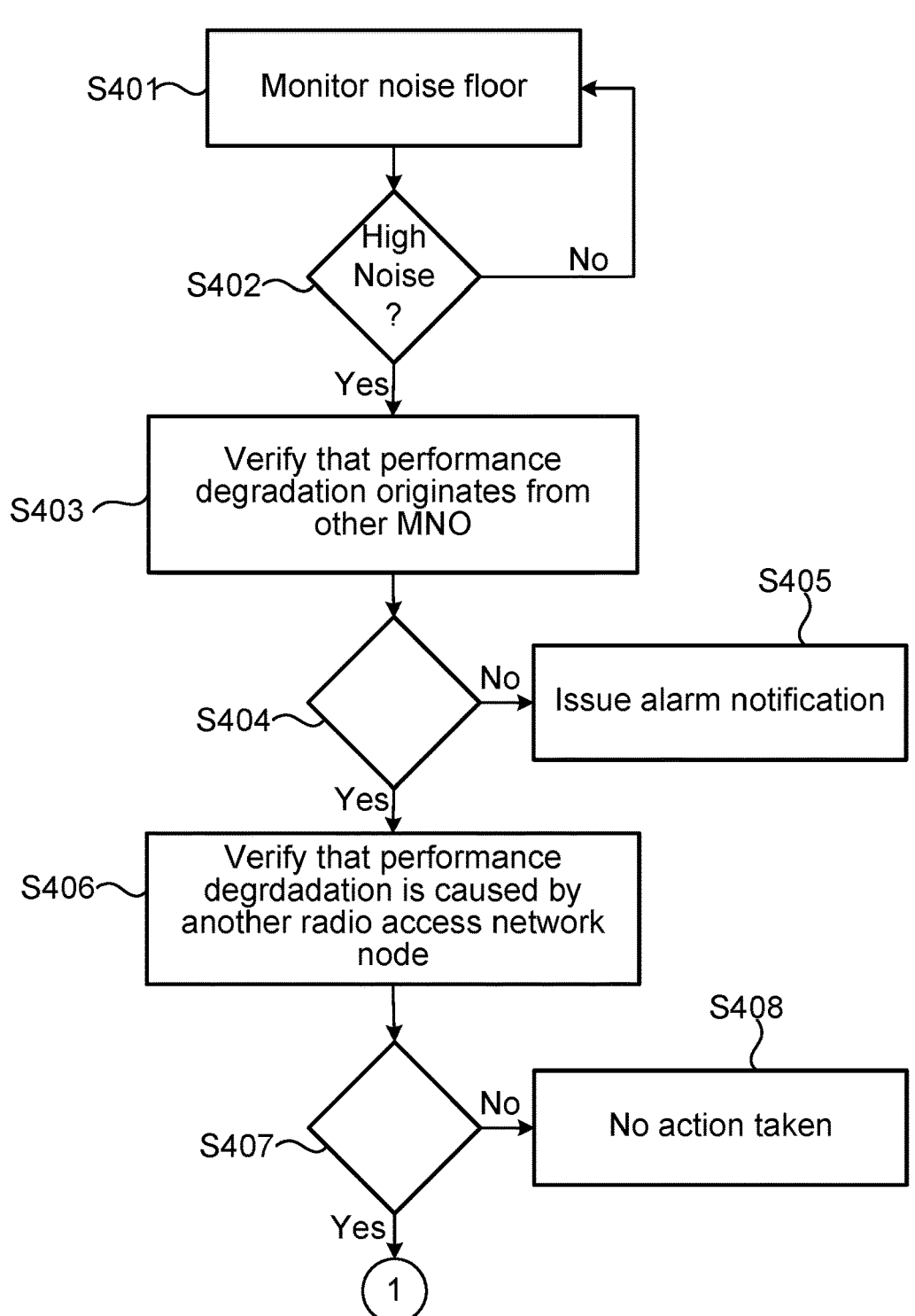
Figure 6:
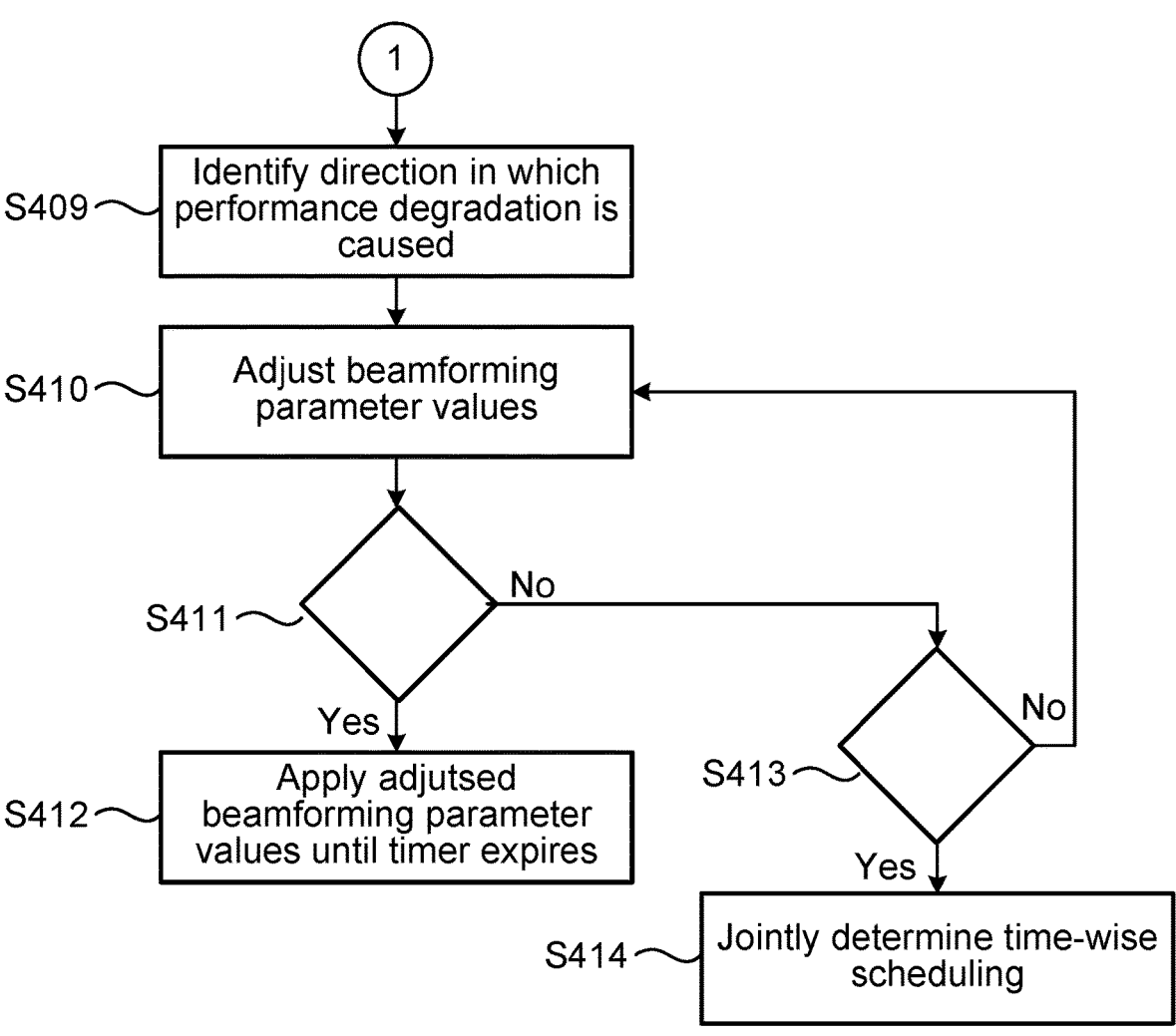

One particular method for performance degradation handling between a first radio access network node 200*a* and a second radio access network node 200*b* based on at least some of the above disclosed embodiments will now be presented with reference to the flowchart of FIG. 6.

S401: The first radio access network node 200*a* monitors its noise floor either continuously or at least at regular time intervals.

S402: The first radio access network node 200*a* checks if the noise floor is higher than a threshold noise value. If yes, this is an indication of performance degradation and action S403 is entered, and if no, action S401 is entered again.

S403: The first radio access network node 200*a* verifies that the performance degradation originates from another MNO than its own MNO.

S404: If the verification in action in S403 is successful (i.e., when the performance degradation is determined as originating from another MNO than its own MNO), action S406 is entered and else (i.e., when the performance degradation is not determined as originating from another MNO than its own MNO) action S405 is entered.

S405: An alarm notification is by the first radio access network node 200*a* issued to its own MNO.

S406: The first radio access network node 200*a* verifies that the performance degradation is caused by transmission from another radio access network node.

S407: If the verification in action in S406 is successful (i.e., when the performance degradation is determined to be caused by transmission from another radio access network node), action S409 is entered and else (i.e., when the performance degradation is not determined to be caused by transmission from another radio access network node) action S408 is entered.

S408: No further action is taken.

S409: The first radio access network node 200*a* identifies the direction in which the performance degradation is caused and provides an indication towards second radio access network node 200*b*, possibly via the central network node 300, of the performance degradation and the direction in which the performance degradation is caused.

S410: The second radio access network node 200*b* adjusts its beamforming parameter values for transmission in the indicated direction.

S411: It is checked whether or not the performance degradation has been removed. If yes, action S412 is entered, and if no action S413 is entered.

S412: The thus adjusted beamforming parameter values for transmission in the indicated direction are applied by the second radio access network node 200*b* at least during a predetermined amount of time, for example until a timer expires.

S413: It is checked whether or not the second radio access network node 200*b* has adjusts its beamforming parameter values more than a predetermined amount of times. If no, action S410 is entered again, and else action S414 is entered.

S414: The first radio access network node 200*a* and the second radio access network node 200*b* jointly determine time-wise scheduling in the particular direction.

It is noted that unsynchronized TDD operation between mobile network operators as herein disclosed should be not confused with unsynchronized operation within the network (e.g. as caused by having both an indoor and an outdoor deployment within the same network) for one and the same mobile network operator. Network planning and/or interference handling (e.g. Remote Interference Management (RIM)) might be used to mitigate unsynchronized operation within the network but might not be useful when addressing the issue of unsynchronized TDD operation between mobile network operators with independent deployments. RIM is based on signal processing at the receiver of the victim radio access network node to cancel interference whereas the herein disclosed embodiments are aimed at addressing the issue already at the transmitter of the aggressor radio access network node so as to avoid interference in the direction of the radio access network node.

Figure 7:
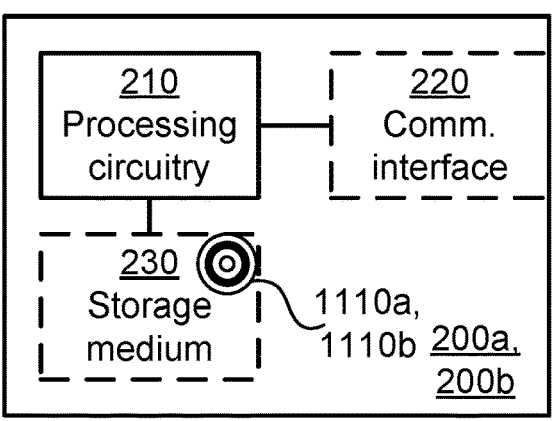
FIG. 7 is a schematic diagram showing functional units of a radio access network node according to an embodiment.

FIG. 7 schematically illustrates, in terms of a number of functional units, the components of a radio access network node 200a, 200b configured to act as the above disclosed first radio access network node 200a and/or the above disclosed second radio access network node 200b. According to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio access network node 200a, 200b to perform a set of operations, or actions, as disclosed above. For example, the storage medium 230 may store the set of operations, and the processing circuitry 210 may be configured to retrieve the set of operations from the storage medium 230 to cause the radio access network node 200a, 200b to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio access network node 200a, 200b may further comprise a communications interface 220 for communications with other radio access network nodes, one or more central network nodes 300, subscribers 170a, 170b, 170c, 170d, as well as other entities, functions, nodes, and devices of the communication network 100a, 100b. As such the communications interface 220 may comprise one or more transmitters and receivers, comprising analogue and digital components.

The processing circuitry 210 controls the general operation of the radio access network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio access network node 200a, 200b are omitted in order not to obscure the concepts presented herein.

Figure 8:
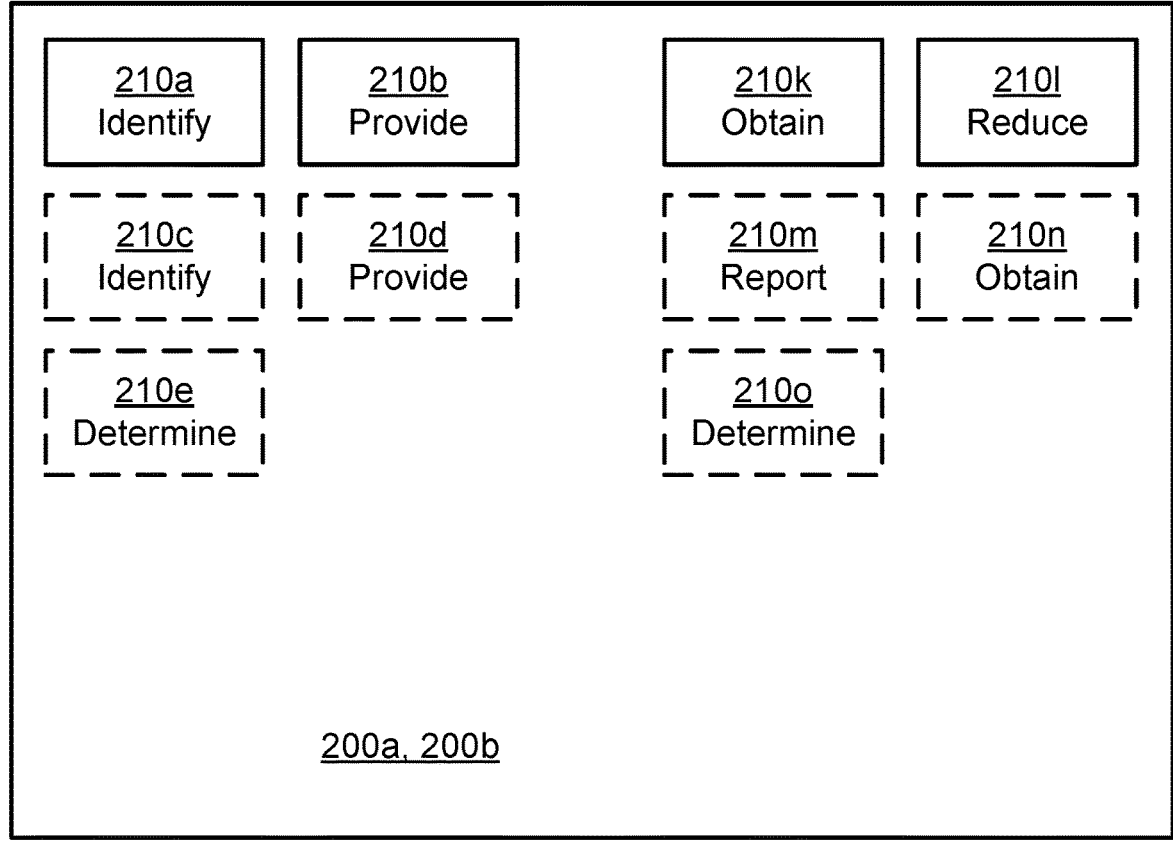
FIG. 8 is a schematic diagram showing functional modules of a radio access network node according to an embodiment.

FIG. 8 schematically illustrates, in terms of a number of functional modules, the components of a radio access network node 200a, 200b according to an embodiment. The radio access network node 200a, 200b when configured to act as a first radio access network node 200a comprises an identify module 210a configured to perform action S102, and a provide module 210b configured to perform action S104. The radio access network node 200a, 200b when configured to act as a first radio access network node 200a might further comprise a number of optional functional modules, such as any of an identify module 210c configured to perform action S106, a provide module 210d configured to perform action S108, and a determine module 210e configured to perform action S110.

The radio access network node 200a, 200b when configured to act as a second radio access network node 200b comprises an obtain module 210k configured to perform action 5302, and a reduce module 2101 configured to perform action S304. The radio access network node 200a, 200b when configured to act as a second radio access network node 200b might further comprise a number of optional functional modules, such as any of a report module 210m configured to perform action S306, an obtain module 210n configured to perform action S208, and a determine module 210o configured to perform action S310.

In general terms, each functional module 210a-210e, 210k-210o may be implemented in hardware or in software. Preferably, one or more or all functional modules 210a-210e, 210k-210o may be implemented by the processing circuitry 210, possibly in cooperation with the communications interface 220 and the storage medium 230. The processing circuitry 210 may thus be arranged to from the storage medium 230 fetch instructions as provided by a functional module 210a-210e, 210k-210o and to execute these instructions, thereby performing any actions of the radio access network node 200a, 200b as disclosed herein.

Figure 9:
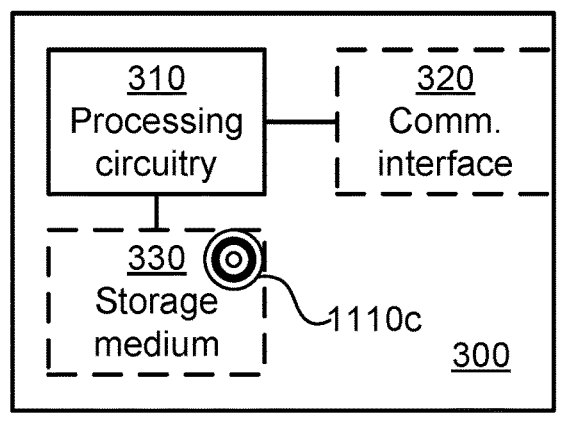
FIG. 9 is a schematic diagram showing functional units of a central network node according to an embodiment.

FIG. 9 schematically illustrates, in terms of a number of functional units, the components of a central network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the central network node 300 to perform a set of operations, or actions, as disclosed above. For example, the storage medium 330 may store the set of operations, and the processing circuitry 310 may be configured to retrieve the set of operations from the storage medium 330 to cause the central network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The central network node 300 may further comprise a communications interface 320 for communications with the radio access network nodes 200a, 200b as well as other entities, functions, nodes, and devices of the communication network 100a, 100b. As such the communications interface 320 may comprise one or more transmitters and receivers, comprising analogue and digital components.

The processing circuitry 310 controls the general operation of the central network node 300 e.g. by sending data and control signals to the communications interface 320 and the storage medium 330, by receiving data and reports from the communications interface 320, and by retrieving data and instructions from the storage medium 330. Other components, as well as the related functionality, of the central network node 300 are omitted in order not to obscure the concepts presented herein.

Figure 10:
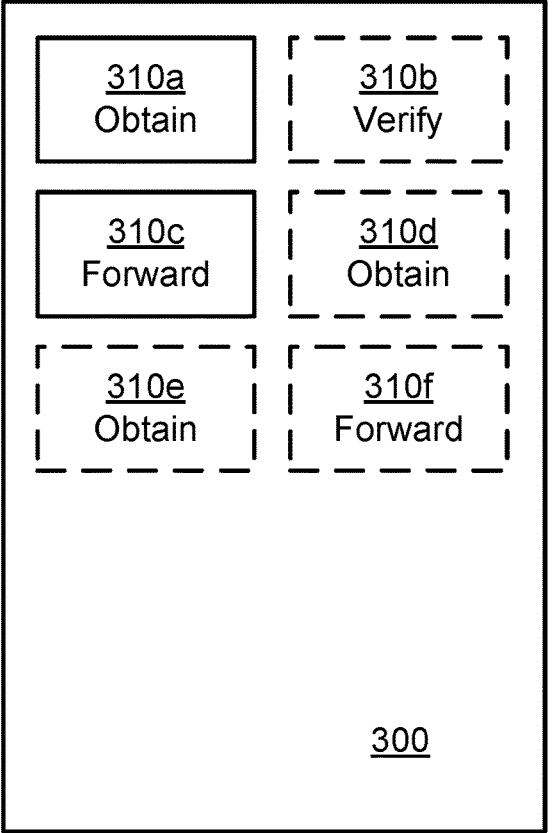
FIG. 10 is a schematic diagram showing functional modules of a central network node according to an embodiment.

FIG. 10 schematically illustrates, in terms of a number of functional modules, the components of a central network node 300 according to an embodiment. The central network node 300 of FIG. 10 comprises a number of functional modules; an obtain module 310a configured to perform action S202, and a forward module 310c configured to perform action S206. The central network node 300 of FIG. 10 may further comprise a number of optional functional modules, such as any of a verify module 310b configured to perform action S204, an obtain module 310d configured to perform action S208, an obtain module 310e configured to perform action S210, and a forward module 310f configured to perform action S212. In general terms, each functional module 310a-310f may be implemented in hardware or in software. Preferably, one or more or all functional modules 310a-310f may be implemented by the processing circuitry 310, possibly in cooperation with the communications interface 320 and the storage medium 330. The processing circuitry 310 may thus be arranged to from the storage medium 330 fetch instructions as provided by a functional module 310a-310f and to execute these instructions, thereby performing any actions of the central network node 300 as disclosed herein.

Figure 11:
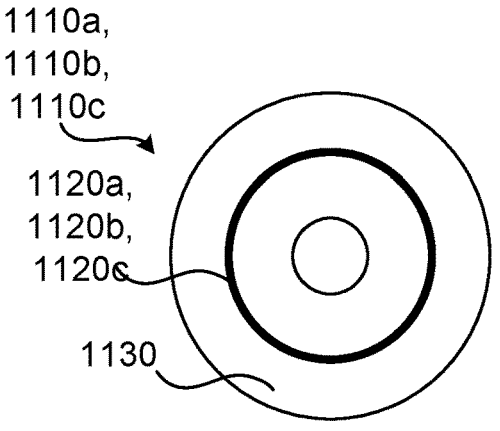
FIG. 11 shows one example of a computer program product comprising computer readable means according to an embodiment.

FIG. 11 shows one example of a computer program product 1110a, 1110b, 1110c comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any actions of the first radio access network node 200a as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any actions of the central network node 300 as herein disclosed. On this computer readable means 1130, a computer program 1120c can be stored, which computer program 1120c can cause the processing circuitry 210 and thereto operatively coupled entities and devices, such as the communications interface 220 and the storage medium 230, to execute methods according to embodiments described herein. The computer program 1120c and/or computer program product 1110c may thus provide means for performing any actions of the second radio access network node 200b as herein disclosed.

In the example of FIG. 11, the computer program product 1110a, 1110b, 1110c is illustrated as an optical disc, such as a CD (compact disc) or a DVD (digital versatile disc) or a Blu-Ray disc. The computer program product 1110a, 1110b, 1110c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b, 1120c is here schematically shown as a track on the depicted optical disk, the computer program 1120a, 1120b, 1120c can be stored in any way which is suitable for the computer program product 1110a, 1110b, 1110c.

Figure 12:
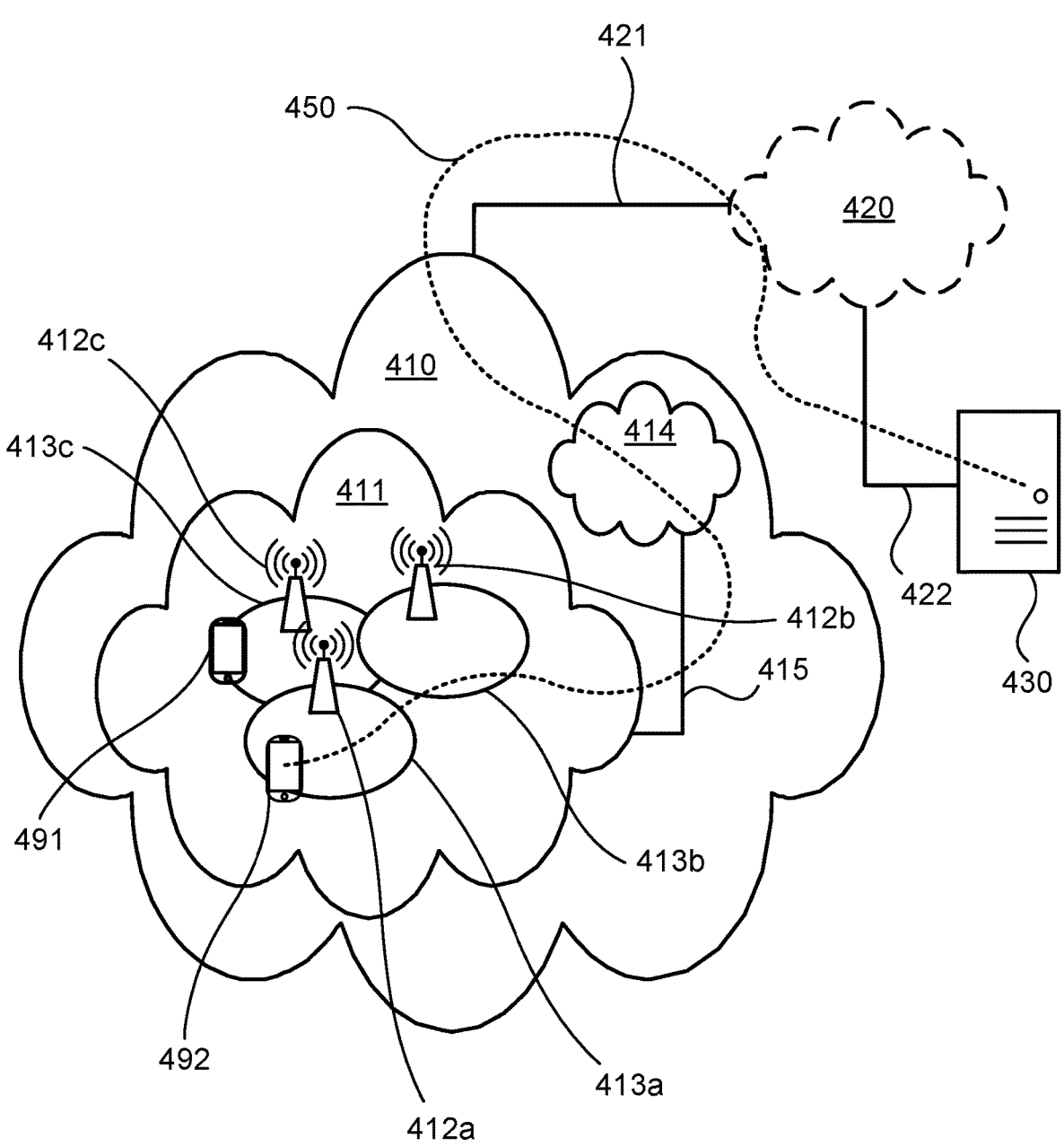
FIG. 12 is a schematic diagram illustrating a telecommunication network connected via an intermediate network to a host computer in accordance with some embodiments.

FIG. 12 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of radio access network nodes 412a, 412b, 412c, such as NBs, eNBs, gNBs (each corresponding to one of the radio access network nodes 200a, 200b of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the subscribers 170a, 170b, 170c, 170d of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 13:
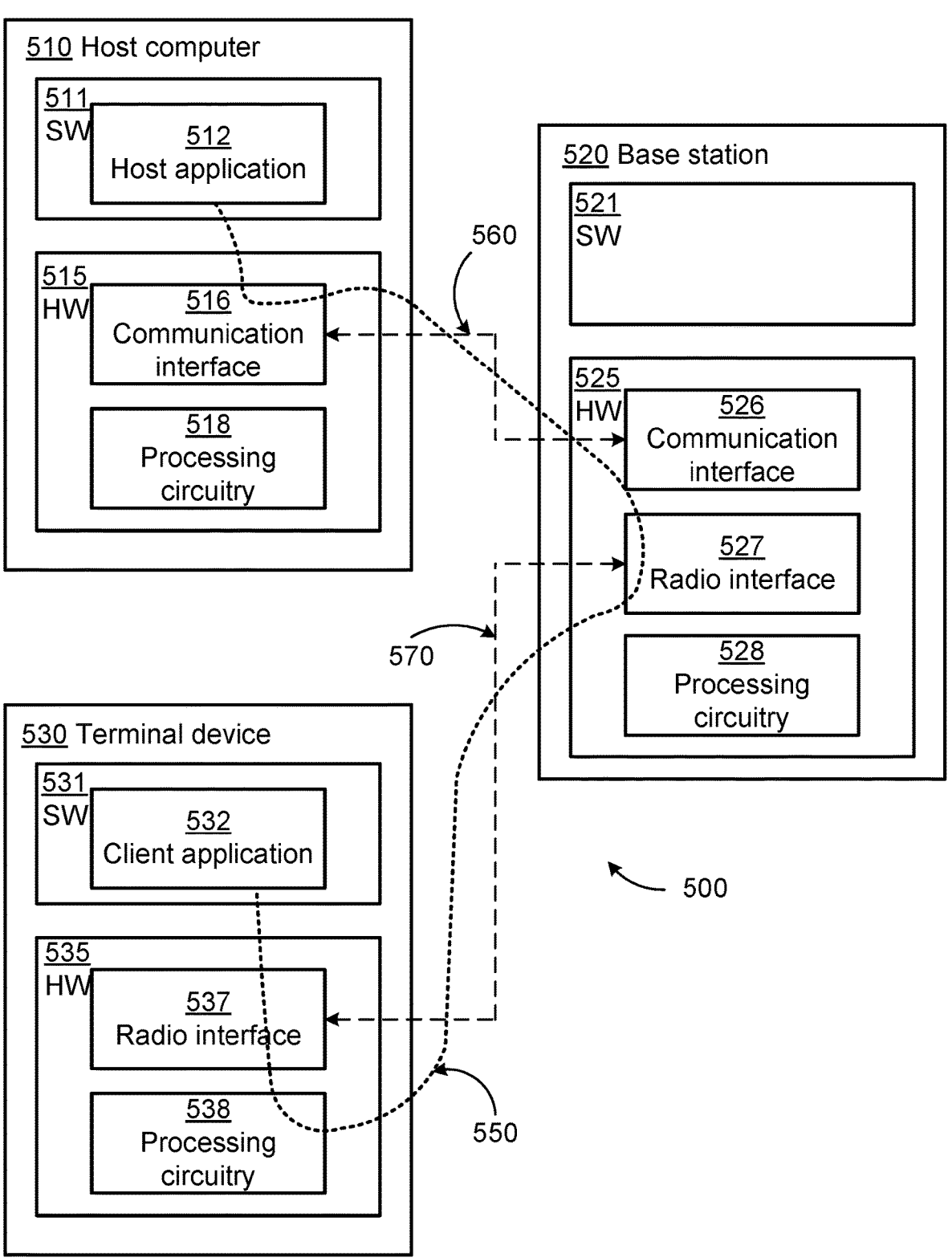
FIG. 13 is a schematic diagram illustrating host computer communicating via a radio base station with a terminal device over a partially wireless connection in accordance with some embodiments.

FIG. 13 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the subscribers 170a, 170b, 170c, 170d of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network nodes 200a, 200b of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by radio access network node 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 13 may be similar or identical to host computer 430, one of network nodes 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performance degradation handling between a first radio access network node that operates in a first frequency band and provides network access for subscribers of a first mobile network operator and a second radio access network node that operates in a second frequency band and provides network access for subscribers of a second mobile network operator, the method being performed by the first radio access network node, the method comprising:

identifying a performance degradation impacting the network access for the subscribers of the first mobile network operator, wherein identifying the performance degradation comprises i) determining a particular direction relative the first radio access network node from which the performance degradation originates and ii) determining that the performance degradation is caused by the second radio access network node;

providing, towards the second radio access network node, an indication of the performance degradation, wherein the indication provided towards the second radio access network node specifies the determined particular direction and identifies the second radio access network node as causing the performance degradation;

identifying further performance degradation impacting the network access for the subscribers of the first mobile network operator, wherein the further performance degradation is identified as caused by the second radio access network node;

providing, towards the second radio access network node, a request for time-wise synchronization of operation with the second radio access network node; and jointly determining, with the second radio access network node, time-wise scheduling in the particular direction.

2. The method of claim 1, wherein identifying the performance degradation involves performing measurements throughout the first frequency band for synchronization and/or broadcast signals carrying an identifier of the second radio access network node.

3. The method of claim 1, wherein identifying the performance degradation involves determining a time reference as to time of occurrence of the performance degradation, and wherein the indication of performance degradation further comprises the time reference.

4. The method of claim 1, wherein the performance degradation is caused by signal transmission from the second radio access network node.

5. The method of claim 4, wherein the first radio access network node is configured to provide network access for subscribers of the first mobile network operator in a set of beams, and wherein the particular direction relative the first radio access network node is identified by in which at least one of the beams the signal transmission is received.

6. The method of claim 1, wherein the first radio access network node and the second radio access network node are configured for time division duplex operation when providing network access to their subscribers.

7. The method of claim 1, wherein the first frequency band and the second frequency band are licensed, lightly-licensed, or unlicensed frequency bands.

8. A method for performance degradation handling between a first radio access network node that operates in a first frequency band and provides network access for subscribers of a first mobile network operator and a second radio access network node that operates in a second frequency band and provides network access for subscribers of a second mobile network operator, the method being performed by a central network node, the method comprising:

obtaining, from the first radio access network node, an indication of performance degradation as identified by the first radio access network node, the performance degradation impacting the network access for the subscribers of the first mobile network operator, wherein the indication specifies a particular direction relative the first radio access network node from which the performance degradation is identified as originating and identifies the second radio access network node as causing the performance degradation, wherein the first radio access network node determined the particular direction;

obtaining, from the second radio access network node, reporting of a spatial antenna beam pattern as updated by beamforming parameter values being adjusted, wherein the second radio access network node provides network access for its subscribers according to the spatial antenna beam pattern as updated; and forwarding the indication of the performance degradation towards the second radio access network node.

9. The method of claim 8, wherein the indication of the performance degradation further comprises a time reference as to time of occurrence of the performance degradation.

10. The method of claim 8, further comprising, before forwarding the indication of the performance degradation:

verifying that reducing beamforming gain by the second radio access network node in the particular direction would not violate any priority condition for the second mobile network operator.

11. The method of claim 8, further comprising:

obtaining, from the first radio access network node, a request for time-wise synchronization of operation with the second radio access network node; and forwarding the request towards the second radio access network node.

12. A method for performance degradation handling between a first radio access network node that operates in a first frequency band and provides network access for subscribers of a first mobile network operator and a second radio access network node that operates in a second frequency band and provides network access for subscribers of a second mobile network operator, the method being performed by the second radio access network node, the method comprising:

obtaining an indication of performance degradation as identified by the first radio access network node, the performance degradation impacting the network access for the subscribers of the first mobile network operator, wherein the indication specifies a particular direction relative the first radio access network node from which the performance degradation is identified as originating and identifies the second radio access network node as causing the performance degradation, wherein the first radio access network node determined the particular direction; and reducing beamforming gain in the particular direction by adjusting beamforming parameter values as applied when providing network access for the subscribers of the second mobile network operator, wherein the beamforming parameter values are adjusted by application of a spatial filtering mask to the beamforming parameter values.

13. The method of claim 12, wherein a spatial antenna beam pattern according to which the second radio access network node provides network access for its subscribers is updated by the beamforming parameter values being adjusted, the method further comprising:

reporting the spatial antenna beam pattern as updated to a central network node.

14. The method of claim 12, further comprising:

obtaining a request for time-wise synchronization of operation with the second radio access network node; and jointly determining, with the first radio access network node, time-wise scheduling in the particular direction.

15. A first radio access network node for performance degradation handling between the first radio access network node that is configured to operate in a first frequency band and to provide network access for subscribers of a first mobile network operator and a second radio access network node that is configured to operate in a second frequency band and to provide network access for subscribers of a second mobile network operator, the first radio access network node comprising processing circuitry, the processing circuitry being configured to cause the first radio access network node to:

identify a performance degradation impacting the network access for the subscribers of the first mobile network operator, wherein identifying the performance degradation comprises i) determining a particular direction relative the first radio access network node from which the performance degradation originates and ii) determining that the performance degradation is caused by the second radio access network node;

provide, towards the second radio access network node, an indication of the performance degradation, wherein the indication provided towards the second radio access network node specifies the determined particular direction and identifies the second radio access network node as causing the performance degradation;

identify further performance degradation impacting the network access for the subscribers of the first mobile network operator, wherein the further performance degradation is identified as caused by the second radio access network node;

provide, towards the second radio access network node, a request for time-wise synchronization of operation with the second radio access network node; and jointly determine, with the second radio access network node, time-wise scheduling in the particular direction.

16. A central network node for performance degradation handling between a first radio access network node that operates in a first frequency band and provides network access for subscribers of a first mobile network operator and a second radio access network node that operates in a second frequency band and provides network access for subscribers of a second mobile network operator, the central network node comprising processing circuitry, the processing circuitry being configured to cause the central network node to:

obtain, from the first radio access network node, an indication of performance degradation as identified by the first radio access network node, the performance degradation impacting the network access for the subscribers of the first mobile network operator, wherein the indication specifies a particular direction relative the first radio access network node from which the performance degradation is identified as originating and identifies the second radio access network node as causing the performance degradation, wherein the first radio access network node determined the particular direction;

obtain, from the second radio access network node, reporting of a spatial antenna beam pattern as updated by beamforming parameter values being adjusted, wherein the second radio access network node provides network access for its subscribers according to the spatial antenna beam pattern as updated; and forward the indication of the performance degradation towards the second radio access network node.

17. A second radio access network node for performance degradation handling between a first radio access network node that is configured to operate in a first frequency band and to provide network access for subscribers of a first mobile network operator and the second radio access network node that is configured to operate in a second frequency band and to provide network access for subscribers of a second mobile network operator, the second radio access network node comprising processing circuitry, the processing circuitry being configured to cause the second radio access network node to:

obtain an indication of performance degradation as identified by the first radio access network node, the performance degradation impacting the network access for the subscribers of the first mobile network operator, wherein the indication specifies a particular direction relative the first radio access network node from which the performance degradation is identified as originating and identifies the second radio access network node as causing the performance degradation, wherein the first radio access network node determined the particular direction; and reduce beamforming gain in the particular direction by adjusting beamforming parameter values as applied when providing network access for the subscribers of the second mobile network operator, wherein the beamforming parameter values are adjusted by application of a spatial filtering mask to the beamforming parameter values.

*     *     *     *     *